2,293,778

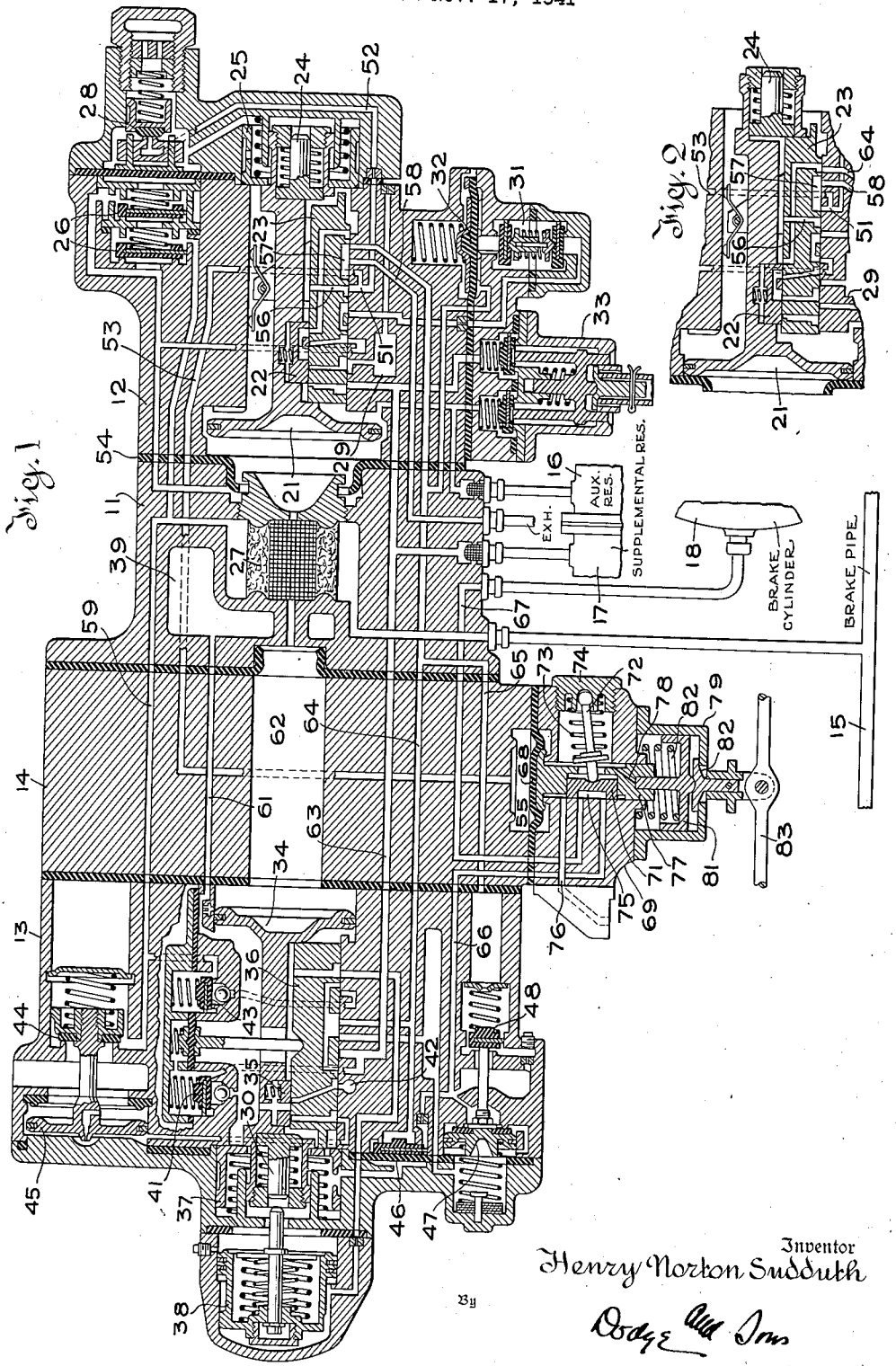
Aug. 25, 1942.  H. N. SUDDUTH  2,293,778
AIR BRAKE
Filed Nov. 17, 1941
Inventor
Henry Norton Sudduth
Attorneys Patented Aug. 25, 1942

UNITED STATES PATENT OFFICE 2,293,778

AIR BRAKE

Henry Norton Sudduth, Watertown, N. Y., assignor to The New York Air Brake Company, a corporation of New Jersey Application November 17, 1941, Serial No. 419,477

10 Claims. (Cl. 303—68)

This invention relates to air brakes of the automatic type and particularly to valve mechanisms for releasing the brakes on a single car when such car is cut out of a train, and at the same time retaining such charge of air as then exists in the reservoirs.

While not limited to use with multiple reservoir systems, the invention will be described as embodied in the AB brake, because this is the current standard and because the importance of air conservation increases with the total reservoir volume affected. The AB brake has a service reservoir and an emergency reservoir.

In the allowed application of Baker and Thompson, Serial No. 404,556, assigned to applicant's assignee, there is described a release valve which can be used with single or multiple reservoir automatic brakes. It is particularly intended for use with the AB brake, and is disclosed and will be here discussed as so embodied. This release valve, when in normal position, connects the AB brake valve with the brake cylinder, but may be manually set to an abnormal position. Motion toward abnormal position isolates the brake cylinder from the AB valve, and when the abnormal position is reached, the valve vents the brake cylinder to atmosphere. When the vent valve reaches this abnormal position it is biased to remain there.

Such a valve requires some automatic restoring means, and two alternative arrangements are shown by Baker and Thompson. The first is a pressure motor subject to brake pipe pressure which resets the release valve to normal position when the car is connected in a train. The second is a pressure motor subject to the pressure in the quick action chamber of the emergency portion, the motor becoming effective when the chamber is partially recharged.

The first of these two schemes has the disadvantage that reset occurs shortly after the brake pipe starts to charge and while the service and emergency portions of the AB valve are in emergency position. Thus, reapplication occurs upon reset and the brake cylinder will be uselessly charged with air from both reservoirs. With the second scheme only the auxiliary reservoir will be drawn on in most cases, but even so, considerable air is wasted.

Since the principal object of the Baker and Thompson invention is to reduce the time required to recharge cars when recoupled in a train after having been set out for yard switching, it is important to avoid all waste of air.

The object of the present invention is to avoid this waste and attendant delay by deferring reset until the service portion (triple valve) has moved to release and recharge position, so that no air can flow to the brake cylinder, from either reservoir when reset occurs.

The most convenient, but not the only technically possible way of securing the result, is to cause the service slide valve to control the supply of air to the resetting motor. To attain this result it is possible and very desirable to avail of a normally unused port on the service portion of the AB valve, the motor-actuating air being then supplied by the auxiliary reservoir.

The porting is such that the reset motor is subject to pressure only when the service portion is in "full release," "retarded recharge" and "preliminary quick service" positions. At all other times it is vented and wholly inactive. If the engineer brings in a train and makes a service stop, a car can be cut out, with the loss of no air except a brake cylinder volume at service pressure already used in making the stop, whereas the Baker and Thompson device normally sacrifices two brake cylinder volumes at emergency pressure.

To secure this economical result, the brakeman pulls the release valve before he uncouples the brake pipe hose. Since the service portions are then in service lap position, the release valve does not reset and the entire emergency reservoir charge and the existing auxiliary reservoir charge are retained. Venting of the brake pipe incident to its disconnection then causes the service and emergency portions of the AB valve to shift to emergency positions in which the pistons seal against the end gaskets.

When the car is again connected in a charged train, and brake pipe pressure rises, a pressure will be reached at which the emergency portion shifts to accelerated release position. This feeds auxiliary reservoir air back to the brake pipe and accelerates shift of the service piston. Thereafter the service piston moves to release position and then admits auxiliary reservoir air to the resetting motor of the release valve. This closes the brake cylinder vent and again connects the brake cylinder to the AB valve.

The same sequence of recharge occurs if the car is cut out after an emergency application, but in such case the emergency reservoir charge will have been somewhat depleted by the application.

In any event, the wasteful reapplication is avoided and cannot be avoided with either of the two prior embodiments.

The preferred embodiment of the invention as adapted to use with the AB brake will now be described by reference to the accompanying drawing in which:

Fig. 1 is an axial section of the complete AB brake valve in normal release and recharge position, with connections to the brake pipe, auxiliary and supplemental reservoirs and brake cylinder indicated, and with the additional components required by the invention carried by an inserted filler piece.

Fig. 2 is a similar view of the service portion, showing it in application position.

The views above described are diagrams conforming to the diagrams used in an instruction manual No. 32, entitled "The AB Freight Brake Equipment," published by the New York Air Brake Company, December 1934. As so diagrammed, all the ports are drawn as if they lay in the plane of section. The filler piece inserted according to the invention is illustrated as much thicker than it would be in actual practice.

Referring particularly to Fig. 1, a pipe bracket 11 carries on one of its two ported mounting faces the service body 12 which (with its attached housings and covers) encloses the service valve mechanism, the quick service limiting valve, the release ensuring mechanism, the by-pass check valves and the reservoir bleed valves. Mounted against the other ported mounting face of the bracket 11, in the usual construction, would be the housing 13 which (together with its attached covers) encloses the emergency valve mechanism and certain related apparatus which will hereafter be mentioned.

According to the present invention, however, a filler piece 14 is interposed between the pipe bracket 11 and the body 13 of the emergency portion. This filler piece has ports which establish the same connections which in the ordinary arrangement would exist between the bracket 11 and body 13 except that it serves to interpose the release valve, forming the subject matter of this invention, between the brake cylinder connection and the brake cylinder port of the brake valve, all as will hereinafter be described more in detail.

The brake pipe is indicated at 15, the auxiliary reservoir at 16, supplemental reservoir (sometimes called the emergency reservoir) at 17, and the brake cylinder at 18. These parts are all conventional and conventional connections are indicated in the drawing. The service valve mechanism is essentially a triple valve and includes a triple piston 21 which controls charging of the reservoirs and which actuates a graduating valve 22 to control ports in the main service slide valve 23, the latter being shifted, as usual, with limited lost motion relatively to the triple piston.

The usual spring urged graduating plunger appears at 24 and the usual spring urged retard stop at 25. The graduating plunger 24 exercises control on graduating motion of the graduating valve and the retard stop 25 serves normally to arrest the service mechanism in normal recharge and release position but to permit it to move to restricted recharge position under abnormally rapid rise of brake pipe pressure.

The by-pass check valves which appear at 26 permit brake pipe flow to by-pass the filter cartridge 27 in reverse directions if the filter cartridge is clogged. The release ensuring valve 28 performs the usual function of assisting releasing motion if the piston 21 tends to stick in application position. The chamber 29 is the preliminary quick service chamber which has a restricted atmospheric vent as clearly shown in the drawing. The quick service limiting valve is indicated generally at 31 and its actuating diaphragm at 32. The reservoir bleed valve mechanism is generally indicated by the numeral 33.

In the emergency portion there is the emergency piston 34 which operates a graduating valve 35 positively and actuates the main slide valve 36 with limited lost motion. It has a spring urged graduating stem 30, a spring urged retard stop 37 and a spring urged plunger 38 whose function is to regulate the initiation of accelerated release following an emergency application. The emergency piston 34 controls the charging of the quick action chamber 39 and any excessive charge is dissipated to the emergency reservoir by the spill-over check valve 41.

The graduating valve 35 and the slide valve 36 establish the bleed connection to the exhaust port 42 which prevents the emergency portion from responding to a service reduction of brake pipe pressure by bleeding air from the quick action chamber 39 at a service rate. The check valve indicated at 43 permits feed back from the connected brake cylinder and auxiliary reservoir during accelerated release following emergency application and prevents reverse flow.

The valve 44 is the emergency brake pipe vent valve and the piston 45 is the emergency vent valve actuating piston which operates the valve just named under the control of the emergency slide valve 36. The parts generally indicated at 46, 47 and 48 exercise control of the development of brake cylinder pressure in emergency applications.

All the parts so far described are standard except for the interposition of the filler piece 14 and the mechanism carried thereby and except for the presence of one additional port in the pipe bracket 11.

The general description above given will permit persons skilled in the air brake art to identify the parts in the diagram which is basically a reproduction of those given in the manual above identified. With this background, the novel features of the invention can now be explained in detail.

In the seat of the service slide valve there is a port 51 which controls flow to and from a passage 52 leading to the seat of the release ensuring valve 28 and flow to and from a passage 53 which in ordinary car installations is blanked at the gasket 54 customarily interposed between the filler piece 11 and the service body 12. In such car installations the passage 53 has no function. It is provided as a standard part of the service portion so that it can be used in certain special installations to control the operation of a transfer valve.

According to the present invention, the pipe bracket 11 is formed with an extension of the passage 53 and this passage is extended through the filler piece 14 to the diaphragm chamber 55 which is part of the resetting motor of the release valve characteristic of the present invention.

In standard service portions of the AB brake, the port 51 is vented to atmosphere in all application positions of the service piston and is subject to auxiliary reservoir pressure in all brake releasing positions of the service piston.

In normal release position the through port 56 in the service slide valve 23 admits auxiliary reservoir air to the port 51. This connection is maintained by an extension at the lower end of port 56 if the piston 21 moves the slide valve 23 inward (to the right) to restricted recharge position. The port 56 is not controlled by the graduating valve 22 and since only the graduating valve moves with the piston 21 when the latter moves to preliminary quick service position, such motion does not affect port 51.

However, when the piston 21 moves to service position (which is the position shown in Fig. 2) the port 56 moves out of register to the port 51 and a cavity 57 connects the port 51 with the exhaust port 58. The service piston has only one application position. In full service and in emergency it remains against the gasket 54 but in graduated service applications the piston 21 and graduating valve 22 move to the right to service lap position in which the graduating valve 22 closes the service port in the service slide valve 23. Even so, the service slide valve does not move, and the port 51 remains connected with the exhaust port 58.

From this it follows that the diaphragm chamber 55 is under pressure in all release positions of the service piston and is vented to atmosphere in all application positions thereof.

The filler piece 14 is provided with passages which connect passages in the pipe bracket 11 with corresponding passages in the emergency portion 13. They simply maintain normal connections. These are the passage 59, which connects the brake pipe vent passage in the pipe bracket with the seat of the brake pipe vent valve 44; the passage 61 which connects the slide valve chamber of the emergency portion with the quick action chamber 39; the passage 62 which leads to the passages through the center of the annular filter cartridge 27 and offers direct communication between the spaces at the outer sides of the service piston 21 and emergency piston 34; the passage 63 which is a continuation of the emergency reservoir passage; and the passages 64 and 65, which form portions of passages through which flow occurs to the brake cylinder. As to all the passages enumerated, the function is simply to establish the customary communication between the pipe bracket 11 and the emergency portion 13.

However, the brake cylinder passage 66 in the emergency portion and the brake cylinder passage 67 in the pipe bracket 11, to which latter the brake cylinder 18 is directly connected, are not placed in free communication but are placed under the control of the brake cylinder vent valve characteristic of the Baker and Thompson invention and used in the same mechanical form according to the present invention.

Underlying the diaphragm chamber 55 is a flexible diaphragm 68 which is clamped at its margin and there serves as a gasket between the filler piece 14 and a chambered housing 69. Branches of the passages 66 and 67 lead through the housing 69 to the seat for a slide valve 71. This slide valve is held to its seat by a toggle thrust mechanism comprising a swinging strut 72 and a coil compression spring 73. The spring reacts between a flange on the strut and a cap 74 in which one end of the thrust member 72 is loosely confined. The valve is shown in its normal inactive position in which a cavity 75 in the face of the valve connects the passages 66 and 67. When the valve is forced upward to its abnormal or releasing position it blanks the end of the port 66 so that the AB brake valve can furnish no air to the brake cylinder. In this position the cavity 75 connects the passage 67 leading to the brake cylinder with an exhaust port 76 in the seat of the valve.

It will be observed that the toggle mechanism tends to retain the slide valve 71 in whichever of these two positions the valve occupies. The valve is confined in a notch in a stem 77, which is guided longitudinally in the housing 69. The stem 77 has a mushroom head which is engaged by the diaphragm 68 and which in its lower or normal position (Fig. 1) is arrested by a flange in the housing 69 as clearly shown in the drawing. When the valve is in this position the space within the housing 69 and consequently the space below the diaphragm 68 is vented by the port 76. These spaces are, however, vented at all times by a port 78 which leads through the lower end of stem 77.

Pressure developed in the diaphragm chamber 55 shifts the stem 77 to normal position whenever the service portion is in releasing position. Manually operable means are provided to force the valve 71 upward to brake cylinder venting position and this can be done when the service piston is in brake applying position so that chamber 55 is vented. The illustrated embodiment of such means comprises a cap 79 mounted on the lower end of the housing 69 and a plunger 81 which is guided in the cap 79 and biased downward by coil compression spring 82. Plunger 81 has a central stem which enters a seat in the lower end of the stem 77. A tilting cam 82 is seated in, and has an arm extending through an opening in the bottom of the guide member 79. By tilting it in any direction, the plunger 81 and consequently the stem 77 will be cammed upward. A reach rod 83 is shown as one practical means for tilting the cam 82.

Suppose an engineer brings in a train including a car equipped with the triple valve illustrated in Fig. 1. If he stops the train with a moderate service application, the service piston 21 on that car will move to application position and then back to service lap position. The brake cylinder will be charged with air from the auxiliary reservoir alone. If the engineer makes an emergency application to stop the train both the pistons 21 and 34 would move outward, that is, toward each other and pressures in the brake cylinder, auxiliary reservoir and supplemental reservoir will equalize.

In one or another of these ways, the train would be stopped. Assuming that the car in question is to be cut out of the train for yard switching or for any other purpose, the first operation is to push or pull the rod 83. This will move the stem 71 to its uppermost position where it will remain because at that time the chamber 55 is vented. The effect of this movement of the valve 71 is to cut off all further flow from the passage 66 to the cylinder 18 and at the same time vent the brake cylinder so that the brakes on that particular car will release. The next step is to close the angle cocks on the two adjacent cars and break the hose connections. This will vent the brake pipe 15 on the car of Figure 1 so its pistons 21 and 34 will move to emergency position (if they are not already there).

The car can then be uncoupled and switched with its AB valve mechanism in emergency position, but with the reservoir charge retained and the brakes fully released. The brakes cannot creep on because the brake cylinder is vented.

When this car is again connected with the charged brake pipe of a train after completion of the switching operations, the pressure in the brake pipe of the car rises. After an appropriate degree of rise, the piston 34 of the emergency portion moves to accelerated release position while the service piston 21 remains in application position. This is the normal cycle of release following emergency.

When accelerated release action starts, air will feed back to the brake pipe but only from the auxiliary reservoir. There is no pressure in the brake cylinder and the brake cylinder is isolated from the AB valve because port 66 is blanked by valve 71. The feed back accelerates the rise of brake pipe air and a condition will be quickly reached in which the service piston starts toward release position. This motion closes the service port (service lap position) and then moves the service slide valve to release position in which the service portion establishes a normal releasing connection and in which the port 56 puts the port 51 under auxiliary reservoir pressure.

Flow through passage 53 to diaphragm chamber 55 establishes auxiliary pressure above the diaphragm 68 and then, at a time when the brakes cannot reapply, valve 71 shifts to normal position so that the brake cylinder 18 is reconnected with the AB valve through the passages 66 and 67 and cavity 75 in valve 71.

It follows that throughout the whole cycle the only air used is that to apply the brakes when stopping the train. There is no reapplication of the brake on the car, and the air dumped back from the auxiliary reservoir to the brake pipe is not wasted, but accelerates release and recharge.

It may be remarked that the valve 71 is not intended for use in releasing stuck brakes and if this function is desired, the retention of the reservoir bleed valve 33 is desirable. However, the invention avoids use of the reservoir bleed valves to condition a car for switching and saves the reservoir charges and the time necessary to recharge.

While the embodiment illustrated is preferred because it avails of existing ports in the AB service portion, a number of modifications within the broad scope of the invention are obviously possible. The use of a separate filler piece 14 is a convenient expedient (particularly for existing equipment), but the filler piece 14 and the parts carried thereby obviously could be constructed as components of the pipe bracket 11. The specific location of the filler piece 14 between the bracket 11 and emergency portion 13 is adopted chiefly because the standard porting of the parts renders that convenient. The specific form of the valve 71 and the mechanism which actuates it are subject to variation.

It should be observed that control of reset is exercised by the service portion alone so that the invention is by no means restricted to use with a brake controlling valve device having separate service and emergency mechanisms. While preservation of reservoir charges is of particular importance where more than one reservoir is used, the invention is adaptable to a single reservoir valve. The embodiment described was chosen as illustrative of a highly desirable application of the invention to a current standard brake valve. While it meets conditions primarily encountered in freight service, it is not limited thereto, for any car equipped with automatic brakes is likely to be cut out of a train from time to time under conditions which would not require connection of its brake pipe.

In short, the description implies no limitation on the scope of the invention which will be defined solely by the claims.

I claim:

1. The combination of a brake controlling valve device of the automatic type having a brake cylinder connection with communicating passage through which actuating air flows to and from the brake cylinder connection; a releasing valve controlling the brake cylinder passage and having a normal position in which the passage is open, and an abnormal position in which the passage is closed and the brake cylinder connection is vented; manually operable means for shifting the releasing valve to said abnormal position; and pressure operated motor means for shifting said releasing valve to said normal position, said motor means being controlled by said brake controlling valve device in such a way as to be active in brake releasing positions thereof and inactive in brake applying positions thereof.

2. The combination of a brake controlling valve device of the automatic type having a brake cylinder connection with communicating passage through which actuating air flows to and from the brake cylinder connection; a releasing valve controlling the brake cylinder passage and having a normal position in which the passage is open, and an abnormal position in which the passage is closed and the brake cylinder connection is vented; manually operable means for shifting the releasing valve to said abnormal position; and restoring means for shifting said releasing valve to said normal position, said restoring means being inactive in brake applying positions of the brake controlling valve device and rendered active by motion of the brake controlling valve device to a brake releasing position.

3. The combination of a brake controlling valve device of the automatic type including an auxiliary reservoir, a brake pipe and a piston movable in response to pressure differentials between the brake pipe and the auxiliary reservoir, said brake controlling valve device having a brake cylinder connection with communicating brake cylinder passage through which actuating air flows to and from the brake cylinder connection; a releasing valve controlling the brake cylinder passage and having a normal position in which the passage is open and an abnormal position in which the passage is closed and brake cylinder connection is vented; manually operable means for shifting said releasing valve to abnormal position; a pressure motor adapted to shift said releasing valve to said normal position; and valve means responsive to motion of said piston between application and release positions and serving to vent said motor when said brake controlling valve device operates to apply the brakes and to charge said motor when the brake controlling valve device operates to release the brakes.

4. The combination defined in claim 3 in which the brake controlling valve device includes a brake controlling slide valve operated by the piston and the valve mechanism which controls the motor comprises ports in said slide valve and its seat.

5. The combination of a brake controlling valve device of the automatic type having a brake cylinder connection with communicating brake cylinder passage through which actuating air flows to and from the brake cylinder connection; a releasing valve controlling the brake cylinder passage and having a normal position in which the passage is open, and an abnormal position in which the passage is closed and the brake cylinder connection is vented; means operable to shift the releasing valve to said abnormal position; impositive means for retaining said releasing valve in each of said positions; a pressure motor serving when subjected to pressure to shift said releasing valve to its normal position; and valve means associated with said brake controlling valve device and serving to vent said pressure motor when said valve device is in brake applying position and admit pressure fluid to said motor when the brake controlling valve device is in brake releasing position.

6. The combination of a brake controlling valve device of the automatic type, having a brake pipe passage which is normally charged and through which control of the device is exercised and having a brake cylinder connection with communicating passage through which actuating air flows to and from the brake cylinder connection; a releasing valve controlling the brake cylinder passage and having a normal position in which the passage is open, and an abnormal position in which the passage is closed and the brake cylinder connection is vented; means operable to shift the releasing valve to said abnormal position; loading means arranged when energized to bias said releasing valve to said normal position; means rendered effective by a brake applying reduction of brake pipe pressure to de-energize said loading means without shifting said releasing valve; and means rendered effective by releasing movement of said brake controlling valve device in response to rising brake pipe pressure to energize said loading means.

7. The combination of a brake controlling valve device of the automatic type, having a brake pipe passage which is normally charged and through which control of the device is exercised and having a brake cylinder connection with communicating passage through which actuating air flows to and from the brake cylinder connection; a releasing valve controlling the brake cylinder passage and having a normal position in which the passage is open, and an abnormal position in which the passage is closed and the brake cylinder connection is vented; means operable to shift the releasing valve to said abnormal position; and restoring means rendered effective by motion of said brake controlling valve device to releasing position in response to charging of the brake pipe, to restore said releasing valve to its normal position.

8. A brake equipment comprising in combination a brake pipe; a brake controlling valve device controlled thereby; local reservoir means and a brake cylinder each connected with said valve device; a vent valve having a normal position in which it connects the brake cylinder in normal relationship to the other components named, and an abnormal position to which it may be moved and in which it isolates and vents said brake cylinder; and a pressure motor arranged to be subject to pressure when the brake controlling valve device is in brake releasing position and vented when said device is in brake applying position, said motor when under pressure serving to shift said vent valve to said normal position.

9. The combination of a normally charged brake pipe; a brake controlling valve device of the automatic type; reservoir means charged through said valve device and comprising at least one reservoir; a brake cylinder operable under control of the valve device by air derived from said reservoir means; a vent valve having an inactive normal position and manually movable from said normal position to an abnormal position in which it conserves the charges in said reservoir means and vents the brake cylinder; and a pressure motor rendered effective to restore said vent valve to its normal position by motion of said brake controlling valve device from application to release position.

10. The combination of a normally charged brake pipe; an auxiliary reservoir; a supplemental reservoir; a brake cylinder; a brake controlling valve device of the automatic type, controlling charging of said reservoirs, said device comprising a service portion operable in response to a service reduction of brake pipe pressure to apply the brakes with auxiliary reservoir air and in response to restoration of brake pipe pressure to release the brakes, and an emergency portion serving in response to emergency reduction of brake pipe pressure to admit air from the supplemental reservoir to the brake cylinder and serving in response to rising brake pipe pressure after an emergency reduction thereof, to isolate one of said reservoirs and to admit air from at least the other reservoir to the brake pipe; a vent valve having a normal position in which it connects the brake cylinder with the brake controlling valve device and shiftable from said normal position to an abnormal position in which it prevents flow from said reservoirs to the brake cylinder and vents the brake cylinder; and a pressure motor controlled by said service portion so as to be effective to restore said vent valve to its normal position when the service portion is in brake releasing positions and ineffective to do so when the service portion is in brake applying positions.

HENRY NORTON SUDDUTH.